United States Patent [19]

Hagerman

[11] Patent Number: 4,733,974
[45] Date of Patent: Mar. 29, 1988

[54] TRANSFORMER LIFE CONSUMPTION INDICATOR

[75] Inventor: Richard E. Hagerman, Penfield, N.Y.

[73] Assignee: Qualitrol Corporation, Fairport, N.Y.

[21] Appl. No.: 891,654

[22] Filed: Jul. 29, 1986

[51] Int. Cl.$^4$ .............................................. G01K 3/04
[52] U.S. Cl. ..................... 374/103; 364/557; 374/57; 374/152
[58] Field of Search ............... 374/102, 152, 103; 364/557

[56] References Cited

U.S. PATENT DOCUMENTS

| 3,638,495 | 2/1972 | Sessler | 374/103 |
| 4,403,296 | 9/1983 | Prosky | 374/152 X |

FOREIGN PATENT DOCUMENTS 55-74430  6/1980  Japan .................................... 374/103

OTHER PUBLICATIONS

Publication, "A Passive Hottest Spot Detector for Transformers", D. A. Yannucci, 7th IEEE/PES Conference Exposition, 4/1-6/79, pp. 190-199.

Primary Examiner—Daniel M. Yasich
Attorney, Agent, or Firm—Charles L. Johnson, Jr.

[57] ABSTRACT

A method and apparatus is provided for computing the life expectancy of electrical power transformers by computing the used life of a transformer at a rate determined by the Arrhenius function of the temperature of the transformer device being monitored.

2 Claims, 3 Drawing Figures

TRANSFORMER LIFE CONSUMPTION INDICATOR

BACKGROUND OF THE INVENTION

1. Field of the Invention

This invention relates generally to a method and apparatus for computing the life expectancy of equipment and more particularly the life expectancy of electrical power transformers.

The useful life of many devices is greatly influenced by the temperature at which it operates. Additionally, this temperature effect is cummulative. One such device is a transformer. Owners of large transformers have large capital investments which they want to protect from abuse and, shortened life expectancy, but at the same time, want to get the most utilization from that investment by loading the transformer as much as possible. Since heat generated within a transformer caused by winding loss, is a function of the loading on the transformer, the temperature of the windings of the transformer is also a function of transformer loading. The owner must, therfore balance the loading of the transformer against the consumption of its expected life to achieve an optimum use of his investment.

Insulation deterioration and, therefore, life expectancy with respect to temperature and time, follows an adaptation of the Arrhenius function that states that the logarithm of insulation life is a function of the reciprocal of the absolute temperature.

2. Description of the Prior Art

Owners of transformers currently monitor winding temperature using either simulations or direct measurements with indicators which record the highest achieved temperature. Such devices, however, do not account for the time function of the temperature effect on life expectancy and, therefore, provide little information as to the actual life consumption of the transformer windings.

SUMMARY OF THE INVENTION

This invention measures and provides an indication of the relative life consumption of devices whose life expectation follow the Arrhenius reaction rate theory.

Conceptually, the invention is an hour meter which, instead of running in calendar hours, runs at a rate determined by the Arrhenius function of the temperature of the device being monitored. The life consumption system consists of a function generator, a consumption rate generator, an accumulator, and a display.

DESCRIPTION OF THE INVENTION

Figure 1:
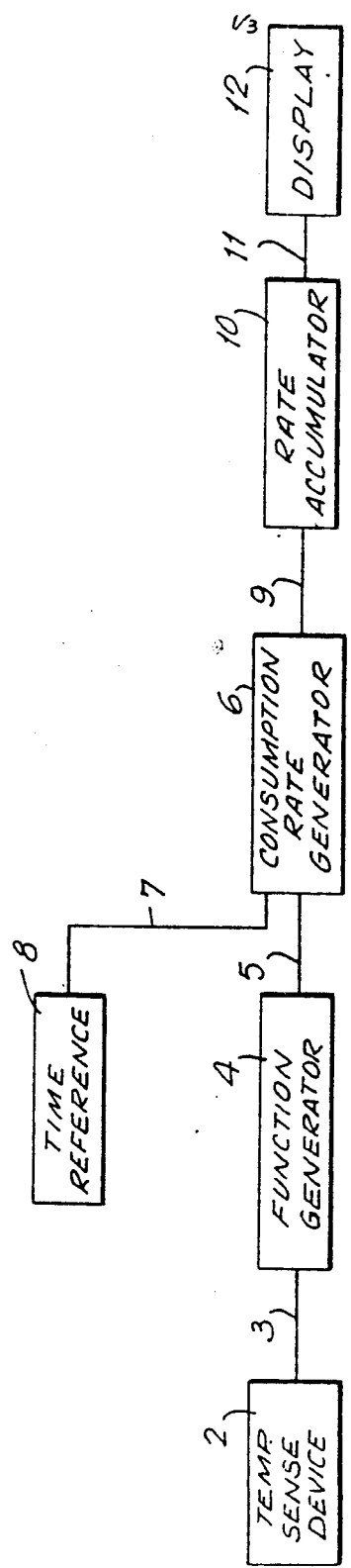
FIG. 1 is a block diagram of the life consumption system.

The method and apparatus of the transformer life consumption system is shown generally at FIG. 1.

A temperature sensing device 2 generates a signal on conductor 3 which represents the temperature of the device being monitored, in this case an electrical transformer.

The function generator 4 receives the signal proportional to temperature on conductor 3 and outputs a pulse rate proportional to the antilog of the reciprocal of the absolute temperature. This output on lead 5 is proportional to the instantaneous life consumption. The actual function generated is:

$$\text{life} = \log^{-1}(A + B/T) = e^{(A + B/T)}$$

Where
T is the absolute temperature
A and B are constants associated with the aging of the particular device being monitored.

The American National Standards Institute (ANSI) adopts standards and test procedures for various types of equipment including oil-immersed Power Transformers. In the IEEE guide ANSI/IEEE C57.91-1981 at pages 11-17, transformer loading, aging of insulation and life expectancy curves are set forth, including the Arrhenius reaction rate theory.

The function generator 4 has provisions for setting the constants A and B per ANSIC 57.92-1981. Specifically, for T in Kelven $B = 16054.0$ and $A = 30.834$ for 65° C. rise and 32.543 for 55° C. rise.

The consumption rate generator 6 receives a binary signal the value of which is proportional to instanteous life consumption and outputs consumption rate. The consumption rate generator output is referenced to a time reference 8 and connected by lead 7.

The consumption rate accumulator 10 performs the integration of life consumption rate on conductor 9 to yield life consumption that is the actual life consumed. This is represented by the information at lead 11.

The display 12 allows the actual life consumed to be viewed, or otherwise used.

As applied to transformers, the actual life expectancy is not known with great accuracy. The nominal life is assumed based on empirical data and past experience. It is, therefore, useful to use the life meter as an "average consumption rate" user to balance loading across several transformers to equalize the life consumption or to decide to add more capacity. In this situation, it is useful to determine the actual hours consumed for some long time period. For convenience, a reset for the consumption rate accumulator is provided as well as an elapsed time accumulator. At the beginning of some period of interest, the user would reset both the elapsed time accumulator and the consumed life accumulator. At the end of the time period, the user would than have consumed time and elapsed time which then can be used to determine average life consumption for the period of interest.

Manufacturers of transformers provide warranties for their products. In warranty dispute situations, it is of interest to the manufactuer to know if the transformer has been abused in service and, therefore, void the warranty. This invention could be used to provide this information. For this case, it may be desirable to permanently attach the rate accumulator and display to the transformer while the rest of the invention equipment is located in the control panel.

Many transformers have more than one winding, each of which operate at different temperatures. This invention can be configured to provide a means to multiplex the function generator and the consumption rate generator and provide a consumed life accumulator for each winding. The display could be multiplexed or dedicated. This type of arrangement is depicted in FIG. 2. in which the multiplexer 14 is shown, along with the previously described apparatus.

Figure 2A:
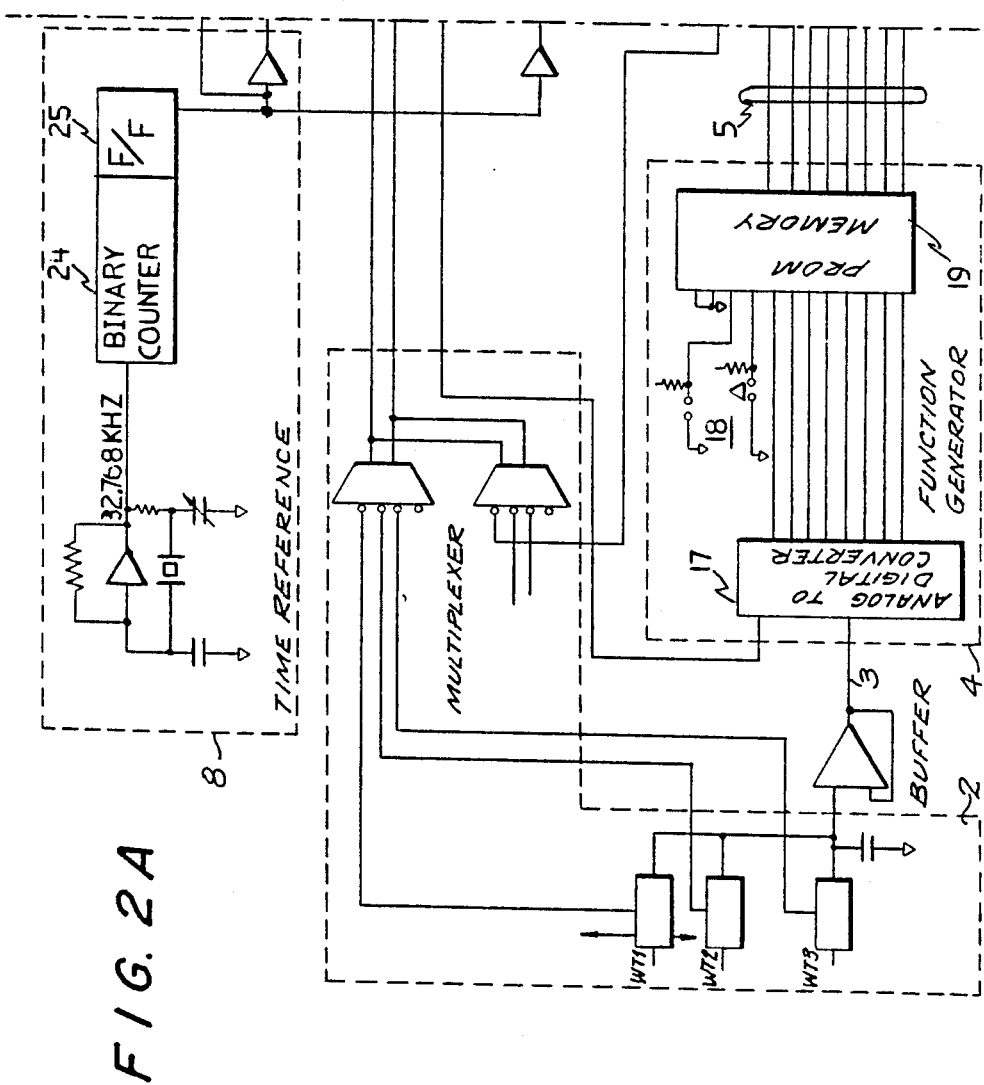
FIGS. 2A and 2B are an expanded schematic diagram of the life consumption system.
Figure 2B:
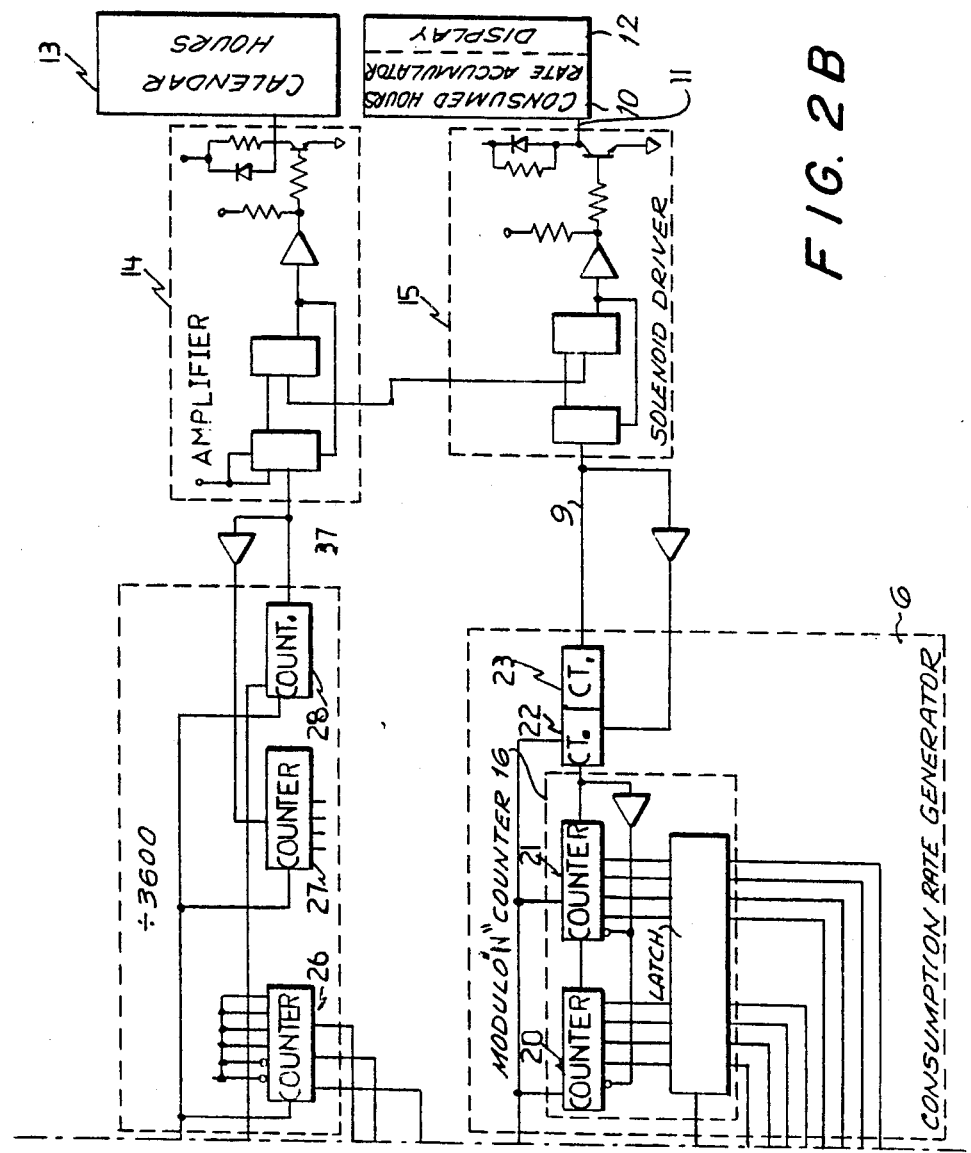

The earlier described components of the invention are shown in more detail in FIG. 2. The modulo N counter 16 generates or counts the function $fe = (A+B/T)$. From the above it can be seen that a method and apparatus has been described in which life consumption information of a transformer is generated using time metering determined by the Arrhenius function of the temperature of the device being monitored. N is a variable depending upon the temperature being measured and represented.

The time reference or time base 8 produces a 1 Hertz square wave signal on conductor 7. This is accomplished with a 32.768 KHZ oscillator circuit well known to those skilled in the art and then dividing the frequency by 16,334 with a 14 bit binary counter 24 and then divide by 2 with a flip flop and outputting on conductor 7.

The 1 HZ time standard is further divided by 3600 with a modulo 16 counter 26 and a modulo 225 counter 27 and 28 to produce a 1 pulse per hour signal on conductor 37. The pulse width of the one pulse per hour signal is then shortened to 64 milliseconds and amplified by amplifier 14 to produce a signal on conductor 11 which causes the electro-mechanical counter 13 to step one count per hour.

The 1 HZ time standard is also divided by the consumption rate generator 6. The consumption rate generator 6 consists of a modulo N counter whose N can vary between 225 and 57,600. This is done by changing the pre-load values for the 4 bit counters. If the preload value on conductors 5 is maximum (255) then counter 21 will produce a carry out on conductor 38 for each 1 HZ clock pulse. If the preload value on conductor 5 is minimum (0) then a carry out on conductor 38 will be produced every 256 clock pulses. The two 4 bit counters 22/23 comprise a modulo 225 counter to properly scale the output rate of the first two counters 20 and 21. The scaling is such that when the preload of the first two counters 20 and 21 is 240, N is 16 and the pulse rate on conductor 9 is one pulse per hour. The 4 bit binary counters 20, 21, 22 and 23 are high speed CMOS type presettable 4 bit binary counters.

The preload value on conductors 5 is provided by the function generator 4. The function generator 4 comprises a programmable read only memory (PROM) 19, an analog to digital converter (ADC) 17 and a selector switch 18. The selector switch 18 provides the higher order 4 bits of address to the PROM 19 while the ADC 17 provides the lower order 8 bits of address. The PROM 19 is therefore partitioned by the selector switch 18 into 16 sections with each section consisting, in the preferred embodiment, of 256 locations. This allows several curves to be programmed into a single PROM with the particular selection made depending on the life characteristics of the particular transformer. The PROM 19 is programmed so that the digitized value on conductors 36 of the winding temperature input 3 provides the correct consumed hours rate on conductor 9.

The output 9 of the life consumption rate generator 6 is fed to a driver 15 whose circuitry and function is the same as the driver 14 previously described. The life consumption rate on conductor 39 is then integrated and displayed by the electro mechanical counter 12.

Variations from the method and apparatus described may be envisioned without departing from the scope of the invention.

The binary counter 24 may be of the type described in the 1984 Logic Databook Volume 1 of the National Semiconductor Corporation, page 3-393.

The analog to digital converter 17 may be of the type described in the 1980 Data Conversion/ Acquisition Databook of National Semiconductor at page 5-21.

The modulo N counters may be of the type described in the 1975 Prentice Hall book "An Introduction to Computer Logic" by H. Troy Nagle at pages 456-457.

The PROM 19 may be of any of the well known memory devices which in effect "store a curve" and allow for a "look up" arrangement to provide an output in response to the input interrogation. Such a memory device may be as described in the 1985 Memory Components Handbook of Intel at pages 1-1 to 1-6 and 4-10. Storage of the type involved is also described in the 1967 McGraw Hill publication "Digital Computer System Principles" at pages 167, 252-254 and 260-267.

I claim:

1. A transformer life consumption indicator for indicating the consumption of electrical transformer life, where life is dependent on temperature comprising;

temperature means for generating an analog electrical signal representative of the temperature of the transformer, function generator means, including a programmable read only memory, responsive to the said temperature means signal for generating a binary output signal proportional to the antilog of the reciprocal of the absolute temperature, this output signal being proportional to the instantaneous life consumption, time reference means, consumption rate generator means responsive to the said time reference means and to the instantaneous life consumption signal from the said function generator means for generating a pulse signal proportional to the consumption rate, consumption rate accumulator means responsive to the signal from the consumption rate generator means for integrating the consumption rate generator pulse signal to produce an output indication of actual life consumed, and display means for displaying an indication of actual life consumed.

2. A method of indicating the amount of life consumed by a transformer subject to variable temperature, including variable temperature resulting from variable current through the transformer windings comprising, determining the temperature of the transformer, generating an electrical analog signal representative of the temperature determined, generating an instantaneous life consumption binary signal, based on the previously generated temperature signal and the Arrhenius reaction rate theory, the instantaneous life consumption signal being determined by the relationship $Life = \log^{-1}(A+B/T) = e^{(A+B/T)}$ where T is the absolute temperature; A and B are constants associated with the aging of the particular device being monitored, providing a pulse time reference signal, producing a life consumption rate pulse signal in response to the instantaneous life consumption binary signal and the pulse time reference signal, and calculating the consumed life of the transformer by integrating the said life consumption rate pulse signal.

* * * * *